United States Patent [19]

Van Dest

[11] 4,008,624
[45] Feb. 22, 1977

[54] SYNCHRONIZING MECHANISM FOR CHANGE SPEED GEARS
[75] Inventor: Jean C. Van Dest, Ris-Orangis, France
[73] Assignee: Massey-Ferguson Services N.V., Curacao, Netherlands Antilles
[22] Filed: Apr. 23, 1975
[21] Appl. No.: 570,900
[52] U.S. Cl. .............................. 74/339; 192/53 H
[51] Int. Cl.² .......................................... F16H 3/38
[58] Field of Search ................... 74/339; 192/53 H
[56] References Cited
UNITED STATES PATENTS
2,932,373  4/1960  Schmid ............................... 74/339

Primary Examiner—Samuel Scott
Assistant Examiner—Wesley S. Ratliff, Jr.
Attorney, Agent, or Firm—William R. Nolte

[57] ABSTRACT

A synchronizing mechanism for change speed gears using a friction energized synchronizer ring which is operable through stop and locking members to prevent collapse of the synchronizer ring until synchronism occurs, also employs a cup member to contain the synchronizer ring for the purpose of freeing the same from adverse frictional effects.

6 Claims, 4 Drawing Figures

SYNCHRONIZING MECHANISM FOR CHANGE SPEED GEARS

This invention relates to improvements in synchronizing mechanisms for change-speed gear trains provided with clutch carriers, especially for motor vehicles. More particularly, the invention relates to such change-speed gear trains provided with resilient split synchronizing rings which are subjected to the influence of locking devices for increasing their servo action, the locking devices being arranged between each of the resilient split synchronizing rings and the hub of the clutch carrier associated therewith.

It is known, for instance, to provide a synchronizing mechanism for change-speed gear systems including a driving member, a driven member, a compressible split resilient spring synchronizing ring carried by one of said members and having spaced ends at the split, and a displaceable clutching means carried by the other member which when brought into engagement with the synchronizing ring is adapted to effect synchronization of said members, and a pair of segmental arcuate locking members disposed opposite each other inside the synchronizing ring for increasing its servo action, each locking member having an end adjacent the position of the split in the synchronizing ring, the other ends of the locking members being in adjacent spaced relation to each other at a position remote from the split in the synchronizing ring, a first stop means anchored in the member carrying the synchronizing ring at said remote position and extending between and being engageable by said other ends of said locking members, a second stop means extending between the ends of the synchronizing ring and between the ends of said locking members located adjacent the split in the synchronizing ring, whereby rotation of the synchronizing ring in one circumferential direction drives said second stop into engagement with the adjacent end of the locking member in the path of said second stop causing said locking member to press against the first stop and its outer surface to engage the inner surface of the synchronizing ring, whereby the driven member is accelerated to the speed of the driving member. When the speed of the driving and driven members are substantially equal, the acceleration as inertia load on the appropriate locking member, reduces to a value where this member no longer presses against the synchronizing ring, with a sufficient force to prevent the clutching member from completing its clutching engagement of driving and driven members.

It has been found that in large synchronizers in which the driven member is subject to drag forces such as may originate from viscous oil or the presence of other rotating members, that even though the inertia or acceleration forces reduce to zero as previously described, the drag forces are sufficiently high to maintain said locking member in a condition where it refuses to allow the synchronizing ring to collapse and allow the clutching member to clutch the driving and driven members together. Attempts have been made to overcome this difficulty by providing an elastic connecting member between the driving and driven members which transmits a considerable proportion of the total force to be transmitted between the driving and driven members during operation, thereby relieving the appropriate segmented arcuate locking member so that as soon as synchronism is reached the synchronizing ring is allowed to collapse. The use of an elastic member for biasing the synchronizing ring to a mid-position to relieve the arcuate member presupposes that the elastic member will be able to overcome frictional forces resisting such movement. In particular, it has been found that in certain circumstances, the synchronizing ring which is usually retained by protruding teeth on the driven member is pressed very hard against such teeth by the arcuate member, and the elastic member is unable to effect movement of the synchronizing ring to a mid-position.

The above difficulty is overcome according to the present invention by mounting the synchronizing ring within a cup member which confines the ring to its required maximum outer diameter and permits it to be moved to its mid-position more easily.

A further advantage conferred by the use of the cup member is that the cup can be mounted with a degree of float which permits the synchronizing ring to accommodate itself so that it is concentric with the displaceable clutching means.

The invention will now be described in detail hereinafter with reference to the accompanying drawings, of which:

Figure 1:
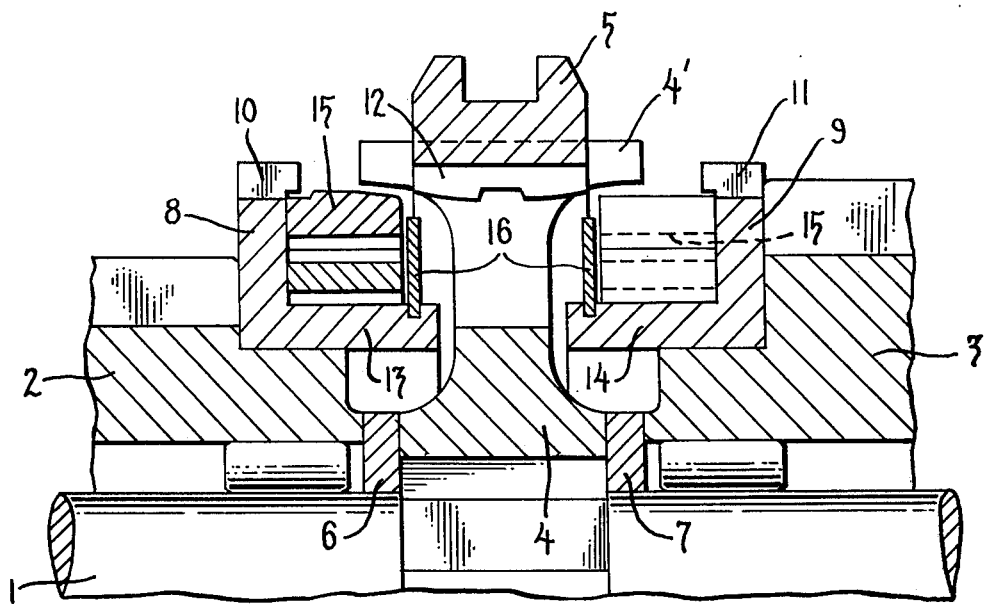
FIG. 1 is a vertical central longitudinal sectional view through a portion of a change speed gear train incorporating a synchronizer according to the prior art.

In the portion of the prior art change-speed gear train shown in FIG. 1, the gear wheels 2 and 3 of different diameter are mounted for rotation on a driven shaft 1, but are retained against longitudinal displacement on the shaft. These gear wheels are permanently in mesh with gear wheels, not shown, fitted on a driving shaft in a known manner. A sleeve carrier 4 is keyed to the shaft 1 and carries a gear clutch sleeve 5, which is shiftable longitudinally. Stop or abutment discs 6 and 7 are mounted on the shaft 1 between the sleeve carrier 4 and the gear wheels 2 and 3, respectively. Clutch carriers 8 and 9, provided respectively with gear teeth 10 and 11, are fitted respectively on and secured to the hubs of the gear wheels 2 and 3. The shiftable sleeve 5 is provided with internal gear teeth 12, which engage the gear teeth 10 and 11 at the end of a gear shifting operation, depending on the direction in which the sleeve 5 is shifted. The sleeve 5 is keyed to the sleeve carrier 4 in a known manner either by its teeth 12 or by a plurality of guide bars 4', of known types, regularly spaced peripherally around the sleeve carrier 4.

The clutch carriers 8 and 9 are provided respectively with hubs 13 and 14 projecting toward the sleeve carrier 4, and a split resilient pre-tensioned synchronizing ring 15 is mounted on each of these hubs 13 and 14 and retained against longitudinal displacement by clamping rings 16 secured respectively in the hubs 13 and 14, as shown in FIG. 1. Pre-tensioning is maintained since the square shoulder on the ring 15 engages under the ends of teeth 10 as shown. This pretension is augmented by the operation of the synchronizer mechanism so that a considerable frictional force may exist between the ring 15 and the teeth 10 which would prevent relative circumferential movement therebetween.

Figure 4:
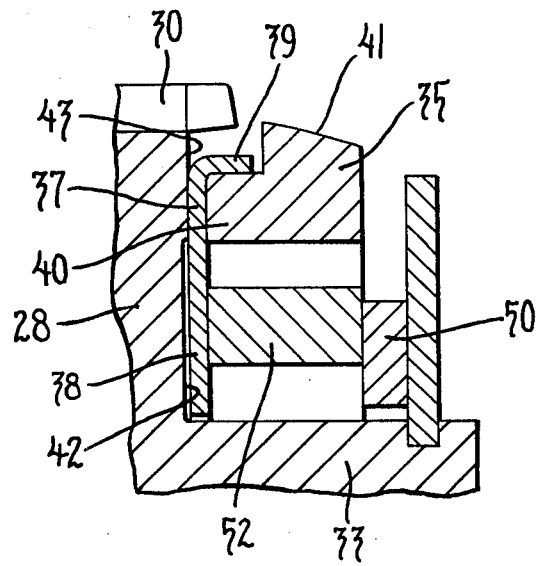
FIG. 4 is an enlargement of a circled detail in the cross section shown in FIG. 2.
Figure 2:
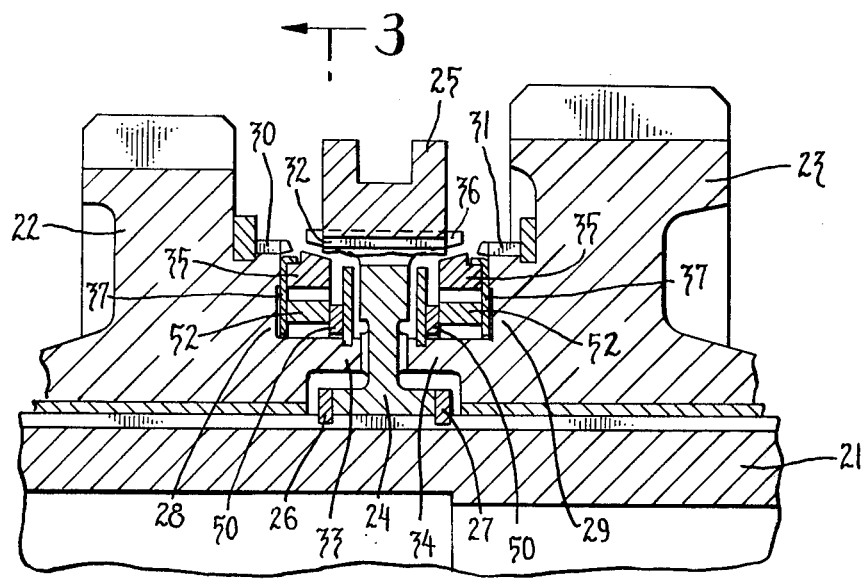
FIG. 2 is a similar view to FIG. 1 of a change-speed gear train incorporating a synchronizer according to the present invention.
Figure 3:
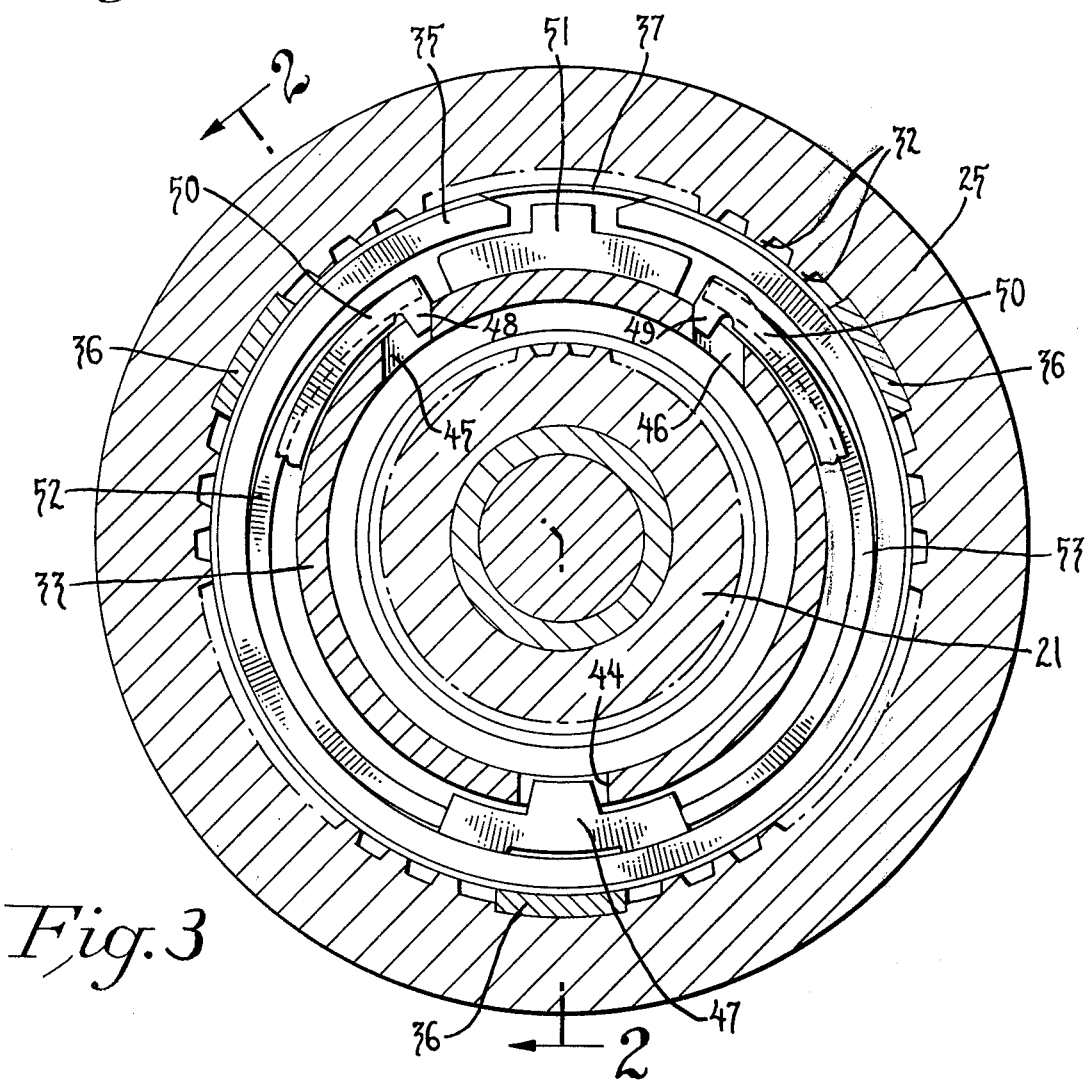
FIG. 3 is a view on section line 3 — 3 in FIG. 2.

The improved construction of the present invention, according to FIGS. 2 to 4, has gear wheels 22 and 23 of different diameter mounted for rotation on shaft 21. A sleeve carrier 24 is keyed to the shaft 21 and carries a gear clutch sleeve 25 which is shiftable longitudinally. Stop disks 26 and 27 are mounted on the shaft 21 between the sleeve carrier 24 and the gear wheels 22 and 23, respectively. Clutch support bosses 28 and 29 are provided, respectively, with gear teeth 30 and 31. The shiftable sleeve 25 is provided with internal gear teeth 32 which engage the gear teeth 30 and 31 to the end of a gear shifting operation, depending on the direction in which the sleeve 25 is shifted. The sleeve 25 is keyed to the sleeve carrier in a known manner by three guide rails 36 of known types, regularly spaced peripherally around the sleeve carrier 24.

The clutch support bosses 28 and 29 are provided, respectively, with hubs 33 and 34 projecting towards the sleeve carrier 24 and a split resilient pretensioned synchronizer ring 35 is mounted over each of these hubs 33 and 34. Pretension is maintained in the ring 35 by a cup member 37 in which the ring or a part of it is compressed and lodged. The cup member is constituted by an annular disc portion 38 which fits loosely over the hubs 33 and 34 and carries at its outer periphery an axially extending flange 39. The synchronizer ring 35 has (see FIG. 4) a flange 40 which is adapted on compression of the ring 35 to be lodged within flange 39 and held there. The friction surface 41 protrudes radially beyond the cup 37. The surface of the support bosses 28 and 29 is undercut slightly at 42 to leave a smooth raised annular surface 43 which serves as a bearing for the back of the cup 37.

It will be seen from FIG. 3 that the hub 33 has slots 44, 45 and 46. The first slot 44 receives a first stop member 47 and slots 45 and 46 receive the ends 48 and 49 of a spring ring 50. The spring ring is given pretension to enable it to fit into position. A second stop member 51 is contained loosely in the space between the hub 33 and the split synchronizer ring 35 so that it lies in the split. Segmental arcuate locking members 52 and 53 entered between the first and second stop members 47 and 51 within the split synchronizer ring 35.

The operation of the apparatus is as follows: When the sleeve 25 is shifted, the teeth 32 make frictional contact with the synchronizer ring 35 and carry it around. The ring 35 makes contact with the second stop member 51 which then engages end 49 of ring 50 and the arcuate locking member 52. Locking member 52 deforms outwardly and presses outwardly against synchronizer ring, forcing it firmly against the flange 39 of cup 35 and at the same time applies a force to accelerate gear 22 through stop member 47. When synchronism has been reached, the ring 50, which has been deflected so that the end 49 leaves its seating during the synchronizing process, now pushes the stop member 51 back, and in doing so has to push the synchronizer ring 35 back, also. This action is facilitated by the presence of the cup 37 which carries the ring 35 in a low friction manner.

Once the second stop member has been pushed back, the arcuate locking member 52 can be relaxed, so removing the outward forces on the synchronizer ring 35. The ring 35 then collapses, and the sleeve 25 slides over the ring 35, and teeth 30 and 32 mesh with each other to complete the gear shift.

The ease with which the cup 37 and ring 35 move back enables a relatively light spring ring 50 to be used.

A further advantage of the placing of the synchronizer ring 35 in the cup 37 is that the looseness of the fit of the cup 37 over the hub 33, 34 enables the synchronizer 35 to take up a position which is concentric with the set of teeth 32 which is most desirable.

A further advantage is that because the synchronizer ring does not touch the teeth 30 no wear of the latter occurs due to frictional contact between them.

It will be appreciated that each of the two synchronizer mechanisms shown in FIG. 2 is capable of performing a synchronizer process in each of two working directions. The two working directions occur when shaft 21 is rotating faster and slower respectively therein, e.g., gear 22 wherein the need for synchronization occurs.

I claim:

1. In a synchronizing mechanism for change speed gear systems, including a split resilient synchronizer ring encircling the hub of a gear, a locking member for acting on the synchronizer ring in one working direction during synchronizing operation, with said locking member being curved and located within the synchronizer ring, and having stops located opposite each other, with the locking member being separate from said stops and braced between them with its ends respectively bearing against the stops when in its locked position, the improvement wherein a carrier is provided for holding the synchronizer ring, said carrier having an annular disc portion with axially extending flange means for restraining said synchronizer ring from expanding beyond a desired diameter, said annular disc portion of said carrier having a central opening of greater diameter than the diameter of said hub of said gear to permit limited floating movement of said carrier and synchronizer ring in radial directions relative to the axia of rotation of said gear.

2. A synchronizing mechanism as claimed in claim 1 wherein said carrier is constituted by a cup-like member.

3. A synchronizing mechanism as claimed in claim 1 which includes spring means operatively positioned to be energized by movement of one of said stops and to bias said one stop in a return direction.

4. A synchronizing mechanism as claimed in claim 3 wherein said carrier is constituted by a cup-like member.

5. A synchronizing mechanism as claimed in claim 4 wherein a second locking member is included for the purpose of effecting synchronization in a second working direction.

6. A synchronizing mechanism as claimed in claim 5 wherein said spring means is arranged so as to be energized by movement of one said stop, irrespective of the working direction and to bias the same in a return direction.

* * * * *